(12) United States Patent
Kaneda et al.

(10) Patent No.: US 6,351,825 B1
(45) Date of Patent: Feb. 26, 2002

(54) METHOD FOR MANAGING FAILED STORAGE MEDIA

(75) Inventors: Yasunori Kaneda, Sugamihara; Tadahiro Teraoka, Yokohama; Takashi Oeda, Sagamihara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/166,849

(22) Filed: Oct. 6, 1998

(30) Foreign Application Priority Data

Oct. 8, 1997 (JP) .............................................. 9-275532

(51) Int. Cl.$^7$ ................................................ G06F 11/00
(52) U.S. Cl. ........................................... 714/27; 360/34
(58) Field of Search .............................. 714/7; 711/114; 369/30; 360/34; 312/223.1, 22.2

(56) References Cited

U.S. PATENT DOCUMENTS

| | | | | |
|---|---|---|---|---|
| 5,752,257 A | * | 5/1998 | Ripol | 711/114 |
| 5,933,395 A | * | 8/1999 | Dang | 369/34 |
| 5,970,030 A | * | 10/1999 | Dimitri | 369/36 |

OTHER PUBLICATIONS

ACM SIGMOD Conference, Jun. 1988, "A Case for Redundant Arrays of Inexpensive Disks (RAID)", D. Patterson et al, 24 pages.

* cited by examiner

Primary Examiner—Robert Beausoleil
Assistant Examiner—Bryce P. Bonzo
(74) Attorney, Agent, or Firm—Mattingly, Stanger & Malur,P.C.

(57) ABSTRACT

A changer device according to the present invention includes: a plurality of storage media; a magazine for holding the plurality of storage media; a plurality of drives for reading and writing data to storage media, each of these drive reading and writing data to a storage medium selected from the plurality of storage media; and a media transporting device transporting the selected storage medium to the drive as well as transporting the moved storage medium to the magazine. When a request to write data is issued, the data and parity data are stored in a striped manner on the plurality of storage media at the plurality of drives. If data cannot be read or written to a storage medium at one of the drives, the media transporting device transports an operational storage medium to this drive. Then, using the storage media at the drives, the data on the failed storage medium is reconstructed. This reconstructed data is stored on the operational storage medium.

14 Claims, 15 Drawing Sheets

METHOD FOR MANAGING FAILED STORAGE MEDIA

BACKGROUND OF THE INVENTION

The present invention relates to a method for handling failed media in devices for managing storage media (generally known as changer devices). More specifically, the present invention relates to a system for managing failed media where a plurality of changer devices is linked to form a disk array system.

As a substitute for hard disk devices (HDD: Hard Disk Drives) used in a standalone manner, the use of disk array systems (RAID: Redundant Arrays of Inexpensive Disks) is being studied. Such systems involve an external storage device that speeds up reads and writes by operating multiple hard disk devices concurrently while improving reliability through redundancy, as described for example, in "A Case for Redundant Arrays of Inexpensive Disks (RAID)" (David A. Patterson, Garth Gibson, and Randy H. Katz, Computer Science Division Department of Electrical Engineering and Computer Sciences, University of California Berkeley). In this paper, different disk array structures are assigned level numbers from 1 to 5. RAID Level 3 can provide improved performance for sequential accesses involving transfer of large blocks of data. RAID Level 5 can provide improved performance for random accesses involving large numbers of small reads and writes.

In the description below, magnetic disk devices that use fixed media are referred to as "hard disk drives" and are distinguished from storage devices that use removable media such as magneto-optical disk drives, optical disk drives, and magnetic disk drives.

The following is a description, referencing FIG. 13 and FIG. 14, of RAID control operations. As shown in FIG. 13, a disk array device 101 includes a plurality of hard disk drives 111–115. A RAID controller 105 controls the manner in which data is striped to the plurality of hard disk drives. RAID controller 105 also determines how redundant data (parity) is generated and where this redundant data is stored.

The disk array device shown in FIG. 13 includes five hard disk drives and contains data storage areas D0 through D15, as shown in FIG. 14. These data storage areas are referred to as "stripes" and can store, for example, 32 KB of data.

Redundant data (parity) storage areas P0–3, P4–7, P8–11, and P12–15, are also provided. Redundant data storage area P0–3 contains the exclusive OR (XOR) values of the data stored in stripe 0 (D0) through stripe 3 (D3), calculated as follows:

(P0–3)=(Data from stripe 0)
XOR (data from stripe 1)
XOR (data from stripe 2)
XOR (data from stripe 3)

In general, a redundant data storage area Pm–n will hold the exclusive OR (XOR) values of the data stored in stripe m (Dm) through stripe n (Dn). This redundant data will be used if one of the hard disk drives in the disk array device fails. A description of the read and write operations performed when one of the hard disk drives has failed, a state referred to as "degraded mode", will be presented later.

Stripe n through stripe m in the data storage area and redundant storage area Pm–n are together referred to as a stripe group. The disk array device is seen by the host computer as a single logical storage device wherein stripe 0 through stripe 15 are continuous. Physically, however, the data is stored as stripes on a plurality of hard disk drives.

First, the operations involved when a host computer 100 reads data from a disk array device 101 will be described. For example, to read data stored in stripe 4 and stripe 5, host computer 100 issues a read request for this data to disk array device 101. Disk array device 101 reads stripe 4 on hard disk drive 111 and stripe 5 on hard disk drive 112 and transfers the data to host computer 100.

Next, the operations involved when host computer 100 writes data to disk array device 101 will be described. Since write operations performed by disk array device 101 involve redundant data, the methods used are different from those that would be used with a standalone hard disk drive. When writing data, redundant data needs to be updated as well. There are two methods for updating the redundant data.

For example, in writing data to stripe 6, one method involves reading data from stripe 4, stripe 5, and stripe 7, which all belong to the same stripe group as stripe 6. Then the following operations are performed to determine the redundant data:

(P4–7)=(data from stripe 6)
XOR (data from stripe 4)
XOR (data from stripe 5)
XOR (data from stripe 7)

Then, the data is written to stripe 6 and the redundant data is written to parity storage area P4–7.

In a second method for writing data to stripe 6, the data contained in stripe 6 before the write operation (referred to as the "old stripe 6 data") and the data contained in parity storage area P4–7 before the write operation (referred to as "the old parity storage area P4–7 data"), are read. The stripe 6 data to be written (the new stripe 6 data) is used to calculate redundant data using the following operations:

(P4–7)=(data from stripe 6)
XOR (old stripe 6 data)
XOR (old P4–7 data)

Next, the data is written to stripe 6 and the redundant data is written to P4–7.

Disk array devices require a greater number of accesses to hard disk drives since it is necessary to write and update redundant data in addition to the main data.

The following is a description of read operations performed in degraded mode by a disk array device that uses parity for redundant data. In this example, hard disk drive 111 in FIG. 14 becomes inaccessible due to failure and data stored in stripe 4 and stripe 5 must be read. The disk array device first tries to read the first half of the data from stripe 4 but cannot perform the read operation due to the failure. In this case, disk array device 101 reads redundant data P4–7 and the data on stripe 5, stripe 6, and stripe 7. The following operations are then performed to recover the data on stripe 4:

(Data from stripe 4)=(P4–7)
XOR (data from stripe 5)
XOR (data from stripe 6)
XOR (data from stripe 7)

The recovered data from stripe 4 and the data read from stripe 5 are transferred to the host computer. Thus, data can be read even if one of the hard disk drives has failed.

Of course, if the disk array device knows beforehand that hard disk drive 111 has failed, the read operation for stripe 4 can be omitted.

To be able to reconstruct data correctly in degraded mode, the correct redundant data (parity) must be generated. There are two methods for keeping the data and the redundant data consistent (parity generation).

In the first method, the following operations are performed for each of the stripe groups:

(Pmn)=(data from stripe m)
[ . . . ]
XOR (data from stripe n)

In the second method, zeros are written to each of the hard disk drives that are in the disk array. Compared to the first method, which requires calculations to be performed, the second method simply writes predetermined data to the hard disk drive, thus simplifying the operation. As long as parity, as described above, is maintained, non-zero data can be used.

When a hard disk drive has failed, a new hard disk drive must be connected in place of the failed hard disk drive to restore normal operations. If the system is equipped with a spare hard disk drive, this spare drive can be used.

To restore data, all the data that had been in the failed hard disk drive 111 must be reconstructed on the newly connected (or spare) hard disk drive. RAID controller 105 restores data for stripe 0, stripe 4, stripe 8, and stripe 12, in that order. To restore the data for stripe 0, the following operations are performed:

(Data for stripe 0)=(P0–3)
XOR (data from stripe 1)
XOR (data from stripe 2)
XOR (data from stripe 3)

The restored stripe 0 data is then written to the newly connected hard disk drive, thus recovering the data from stripe 0. The data from stripe 4, stripe 8, and stripe 12 are recovered in a similar manner, so that all data is restored. Once all the data has been restored, the system shifts from degraded mode to a normal operation state, and read and write operations can be performed as before.

In conventional disk array devices, the use of storage devices having fixed storage media such as hard disk drives was assumed. Thus, the use of removable storage media and storage devices in disk array devices was not considered. In particular, there has been no consideration of disk array devices that use changer devices to manage a plurality of storage media and to transport a desired storage medium to a drive.

FIG. 15 shows a system based on a disk array device that uses removable storage media. In place of hard disk drives 111 through 115 shown in FIG. 13, FIG. 15 shows removable storage media 211 through 215 and drive devices 221 through 225. In the system shown in FIG. 15, the array can be controlled in the same manner as a hard disk drive array when storage media are mounted in the drive devices. Read and write operations performed in degraded mode when a storage medium or a drive device is malfunctioning are handled in the same way as well.

In the disk array device made up of drive devices and removable storage media as shown in FIG. 15, recovery after failure of one of the storage media would be handled by replacing the failed storage medium with a new storage medium placed in the drive device and by reconstructing the data in the new storage medium. This replacement of storage media can be performed manually by the administrator, but it would also be possible to automate the process through the use of a changer device that handles a plurality of storage media. When a storage medium is replaced using a changer device, the placement of the failed storage medium, which can no longer be used, becomes important since it is often not possible to recognize failed storage media visually.

OBJECTS AND SUMMARY OF THE INVENTION

The object of the present invention is to easily identify a failed storage medium in a changer. An administrator using a system in which the present invention is implemented can easily remove the failed storage medium from the changer. This also prevents the wrong storage medium from being removed when a failure takes place.

In order to achieve the objects of the present invention, means for identifying is disposed on specific means for holding storage media (element) in the changer device, allowing a person to identify the specific holding means. The failed media is supported in an element having identifying means.

Possible identification methods include applying a color to a specific element or disposing the specific element at the uppermost position or the lowermost position in a magazine. The magazine referred to here is a magazine that can manage a plurality of elements as one set. It would also be possible to have a magazine containing only a specific element, and to have that magazine be removable or fixed.

DETAILED DESCRIPTION OF THE PREFERRED EMBODIMENTS

The following is a description, with references to the drawings, of the embodiments of the present invention.

First Embodiment

The following is a description, with references to the drawings, of the first embodiment of the present invention.

Figure 1:
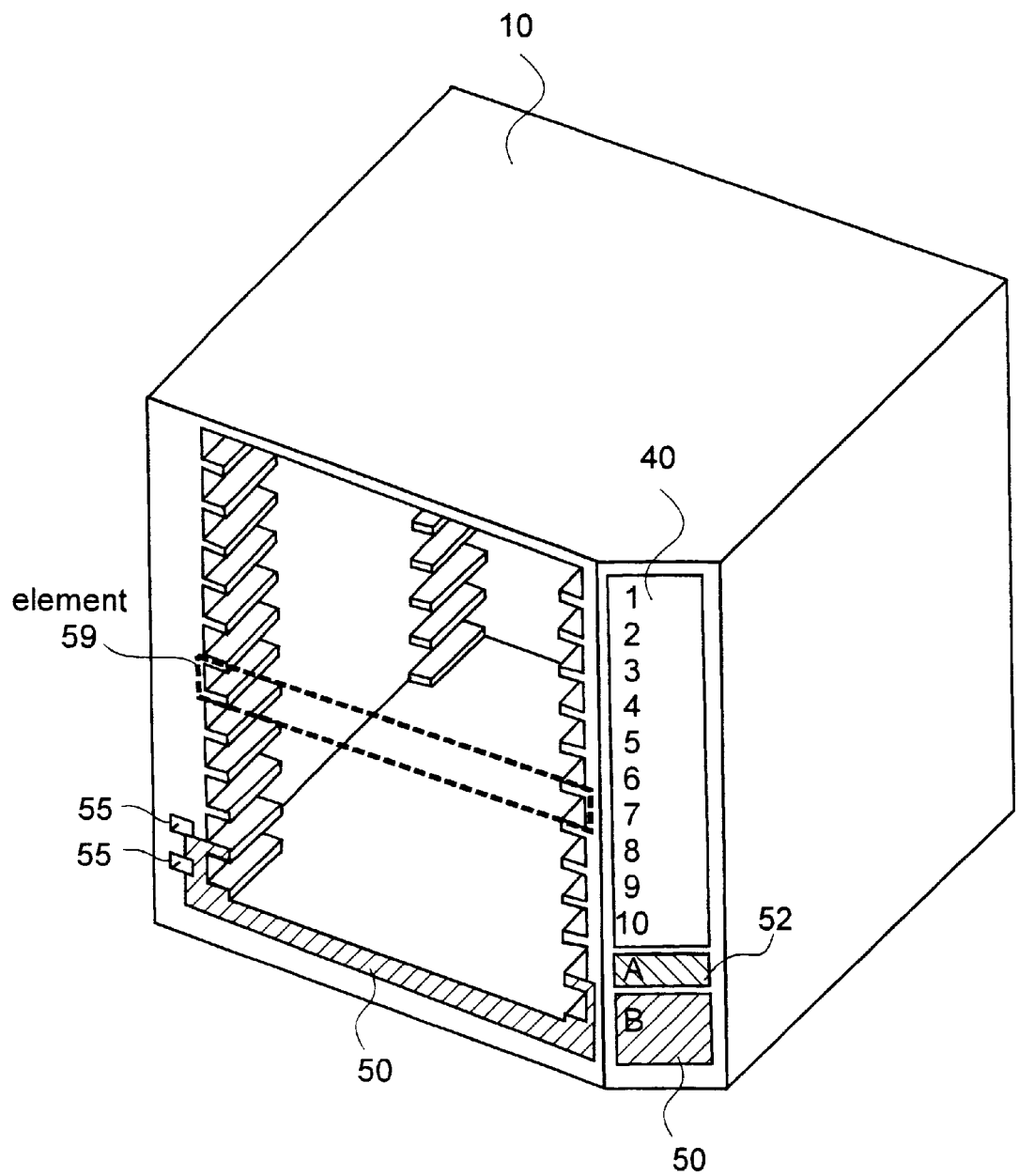
FIG. 1 is a drawing of a magazine according to the present invention.
Figure 2:
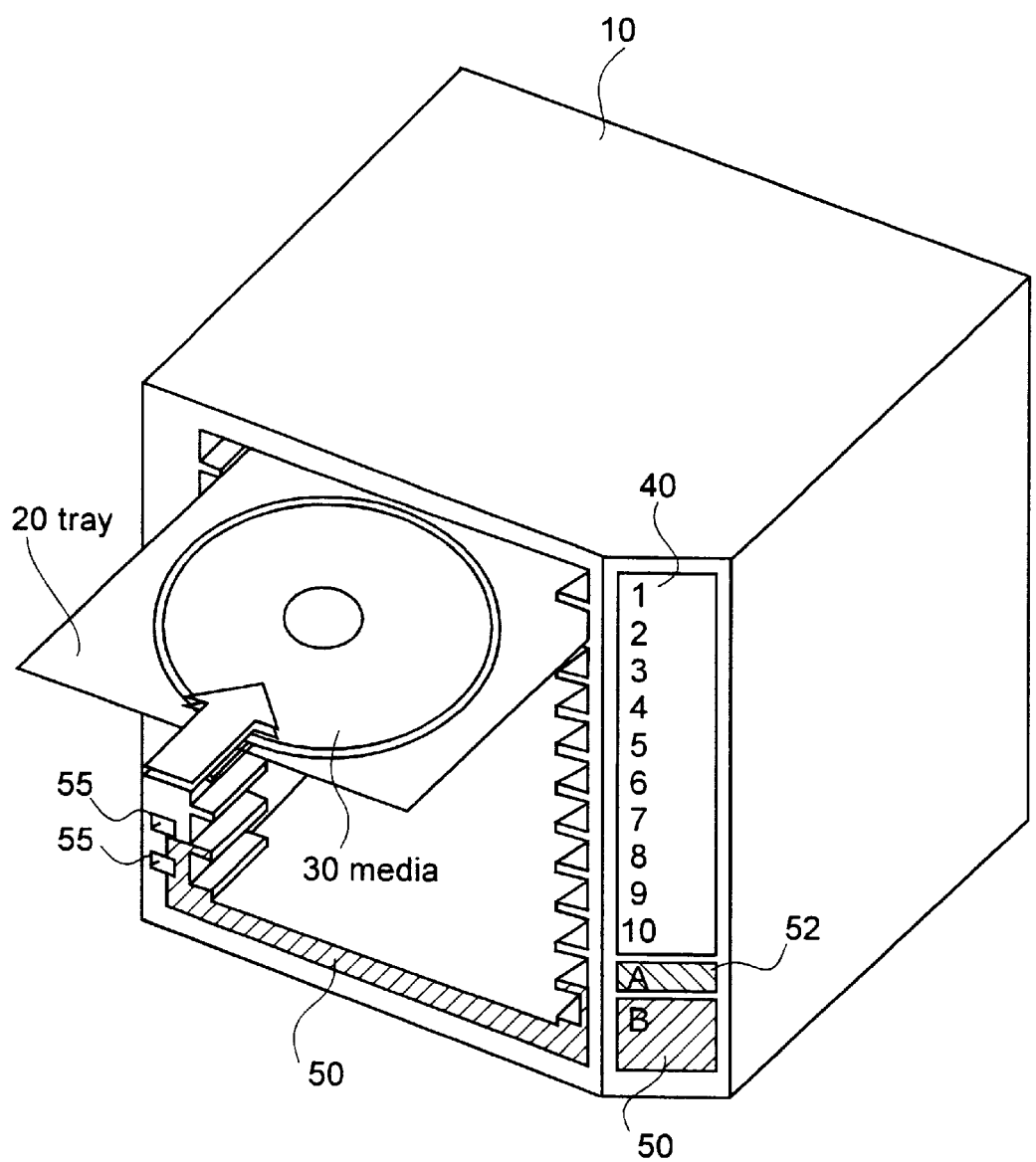
FIG. 2 is a drawing showing a magazine and a medium.

FIG. 1 and FIG. 2 show a magazine 10 used in the present invention. A magazine provides shelf-like structures for holding a plurality of storage media. Magazine 10 includes a plurality of elements 59 for holding media. As shown in FIG. 2, a medium 30 is placed on a tray 20 and is stored in an element 59 of magazine 10. The magazine shown in FIG. 1 and FIG. 2 contains twelve elements 59 and can hold twelve media.

As shown in FIG. 1, the magazine according to the present invention is color coded using three colors to form a first color section 40, a second color section 50, and a third color section 52. Furthermore, holes 55 are formed on magazine 10. First color section 40 and second color section 50 allow users to visually distinguish by color the bottom two elements of the twelve elements. Magazine 10 is used by a changer device 300, which identifies the type of elements in the magazine using holes 55. In this embodiment, element types are also identified by the depth of holes 55.

In this embodiment, color coding is performed with the first color section being "white", the second color section being "red", and the third color section being "green".

Figure 3:
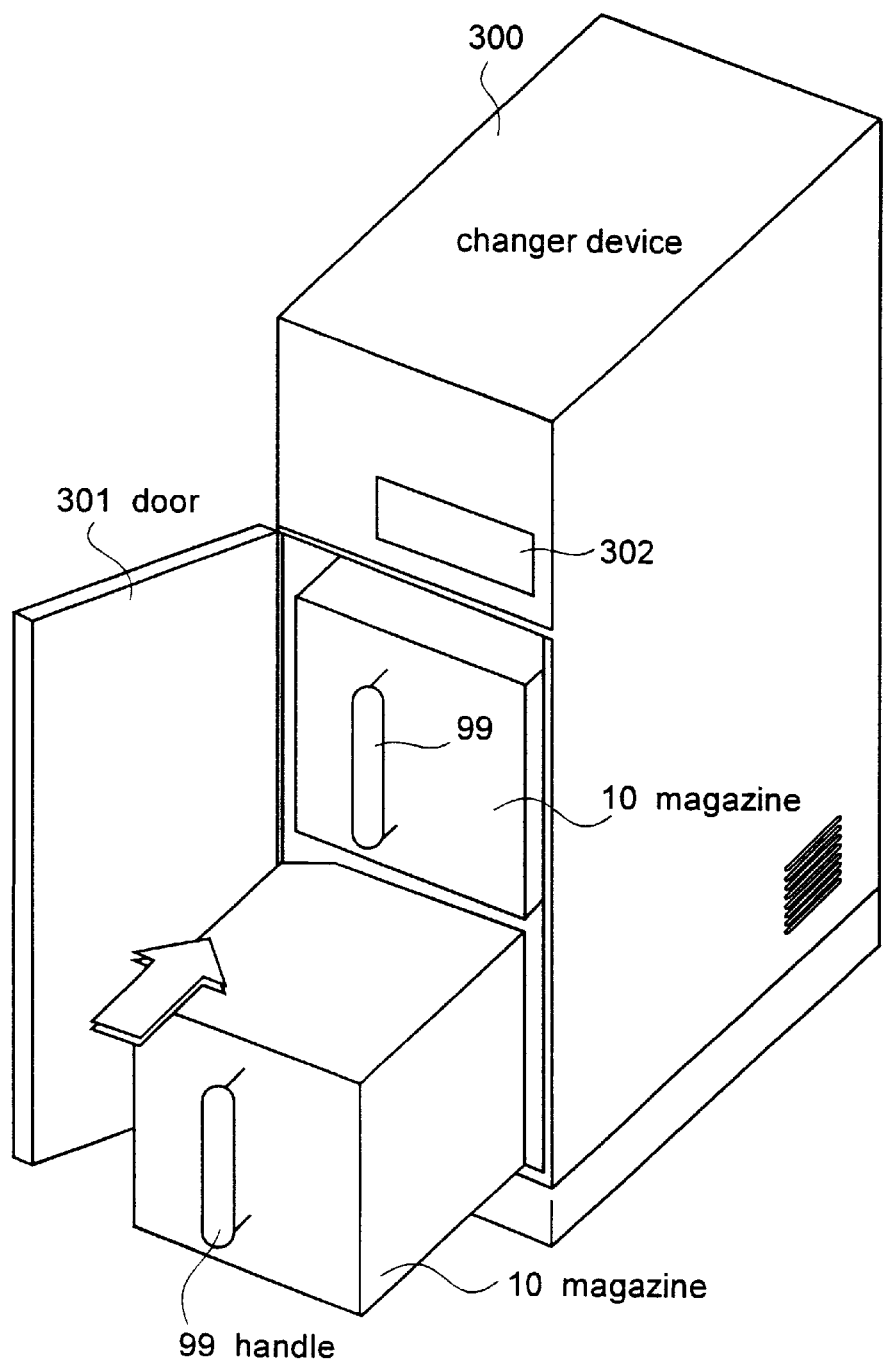
FIG. 3 is a drawing showing an outer view of the changer device according to the first embodiment.

FIG. 3 shows the outer appearance of changer device 300. Changer device 300 includes a door 301 that can be opened and closed. When door 301 is opened, magazine 10 can be inserted or removed. In the changer 300 shown in FIG. 3, two magazines 10 can be mounted. A handle 99 is formed on the back surface of magazine 10 to allow easy handling when mounting to changer device 300. Changer device 300 includes an LCD (liquid crystal display) display 302 to indicate the status of changer device 300.

Figure 4:
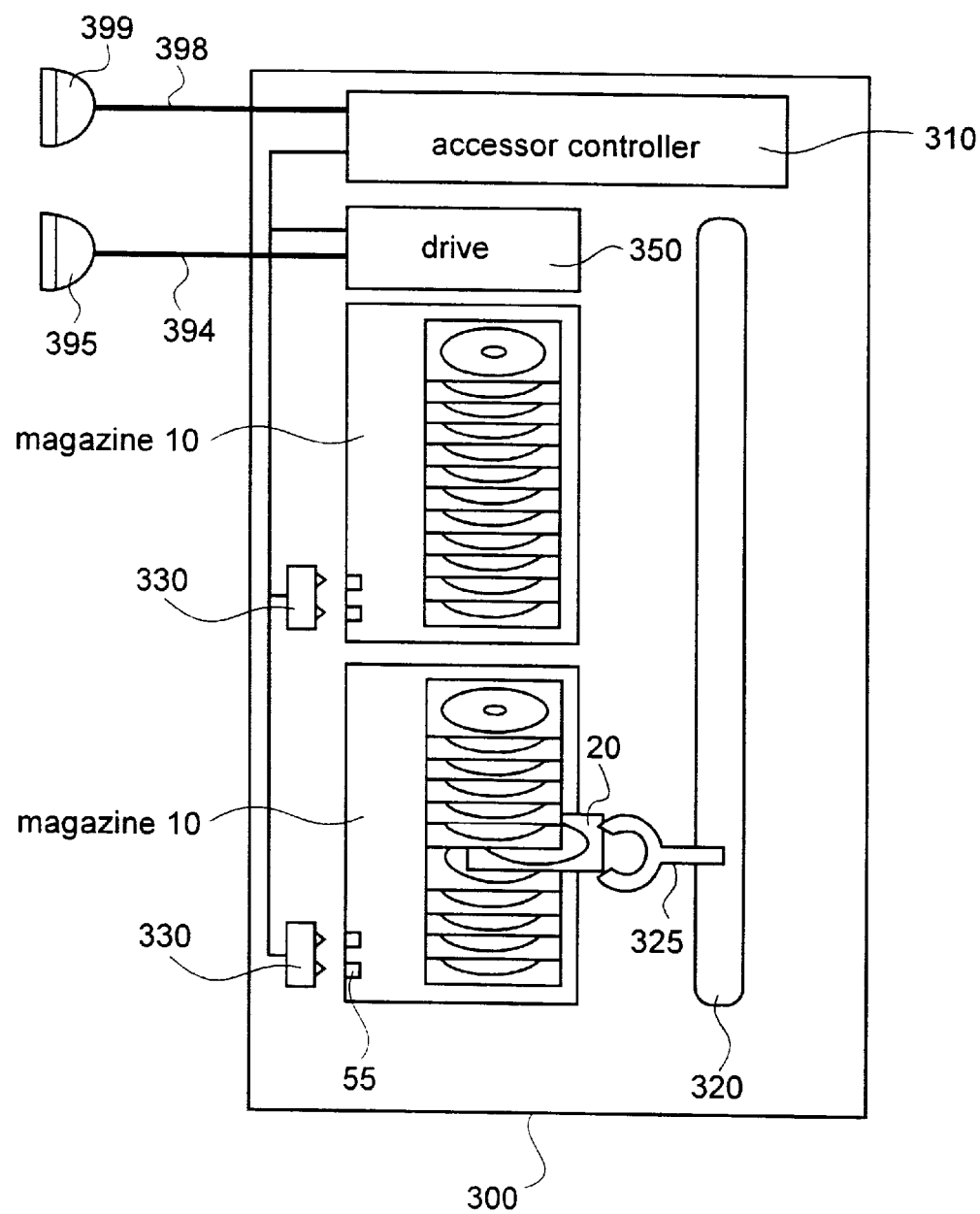
FIG. 4 is a drawing showing the internal structure of the changer device according to the first embodiment.

FIG. 4 shows the internal structure of changer device 300. Changer device 300 contains: two magazines 10; an accessor to grasp and transport medium 30 and tray 20; a drive 350 for performing read and write operations on medium 30; and an accessor controller 310 for controlling the accessors. The accessor includes a vertical positioning section 320 that can be moved up and down, and a handle 325 that can grasp media and move forward and back.

A higher-level system sends commands to accessor controller 310 via a SCSI bus 398 to move a medium. When the command is received, accessor controller 310 controls vertical positioning section 320 so that handle 325 is positioned to the height at which the desired medium is located. Handle 325 is moved forward and then back to pull out desired medium 30. This medium 30 is transported to drive 350 where it is mounted on to drive 350. This series of operations allows read and write operations to be performed on the desired medium. The higher-level system then sends read and write commands to drive 350 via SCSI bus 394. The data read from and written to the medium is transferred via SCSI bus 394.

In this embodiment, a DVD-RAM drive is used for drive 350, and DVD-RAM media are stored in magazine 10.

All media transfer requests sent to changer device 300 are based on element numbers. Changer device 300 shown in FIG. 4 uses two magazines that can each be mounted with twelve media, so element positions are referenced with element numbers 1 through 24. Also, since changer device 300 contains one drive 350, drive 350 is referenced as element number 100.

For example, if a media transfer is requested from element number 10 to element number 100, the medium in element number 10 is mounted on the drive. If a media transfer is requested from element number 100 to element number 10, the medium mounted on the drive is returned to element 10.

If a media transfer is requested from element number 10 to element number 100 and no media is present in element number 10, a "source element empty" error is generated. If, on the other hand, a medium is already present on the drive (element number 100), a "destination element full" error is generated.

Figure 5:
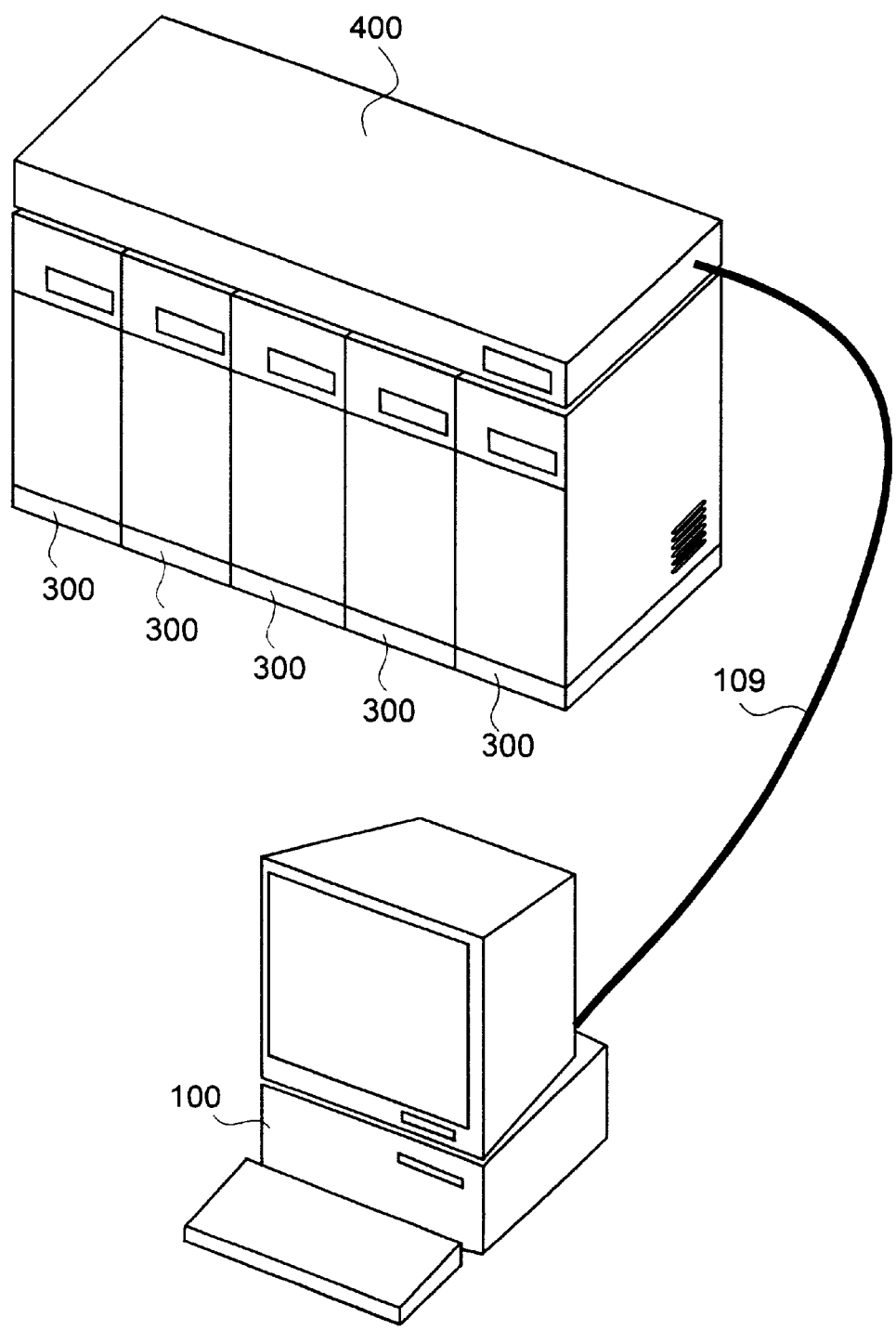
FIG. 5 is a drawing showing an outer view of a disk array device in which five changer devices are used.

FIG. 5 shows a disk array device that uses five changer devices 300. Five changer devices 300 are connected to a disk array controller 400 to provide data striping, centralized processing and generation and processing of redundant data. Disk array controller 400 and host computer 100 are connected via a SCSI bus 109.

Figure 6:
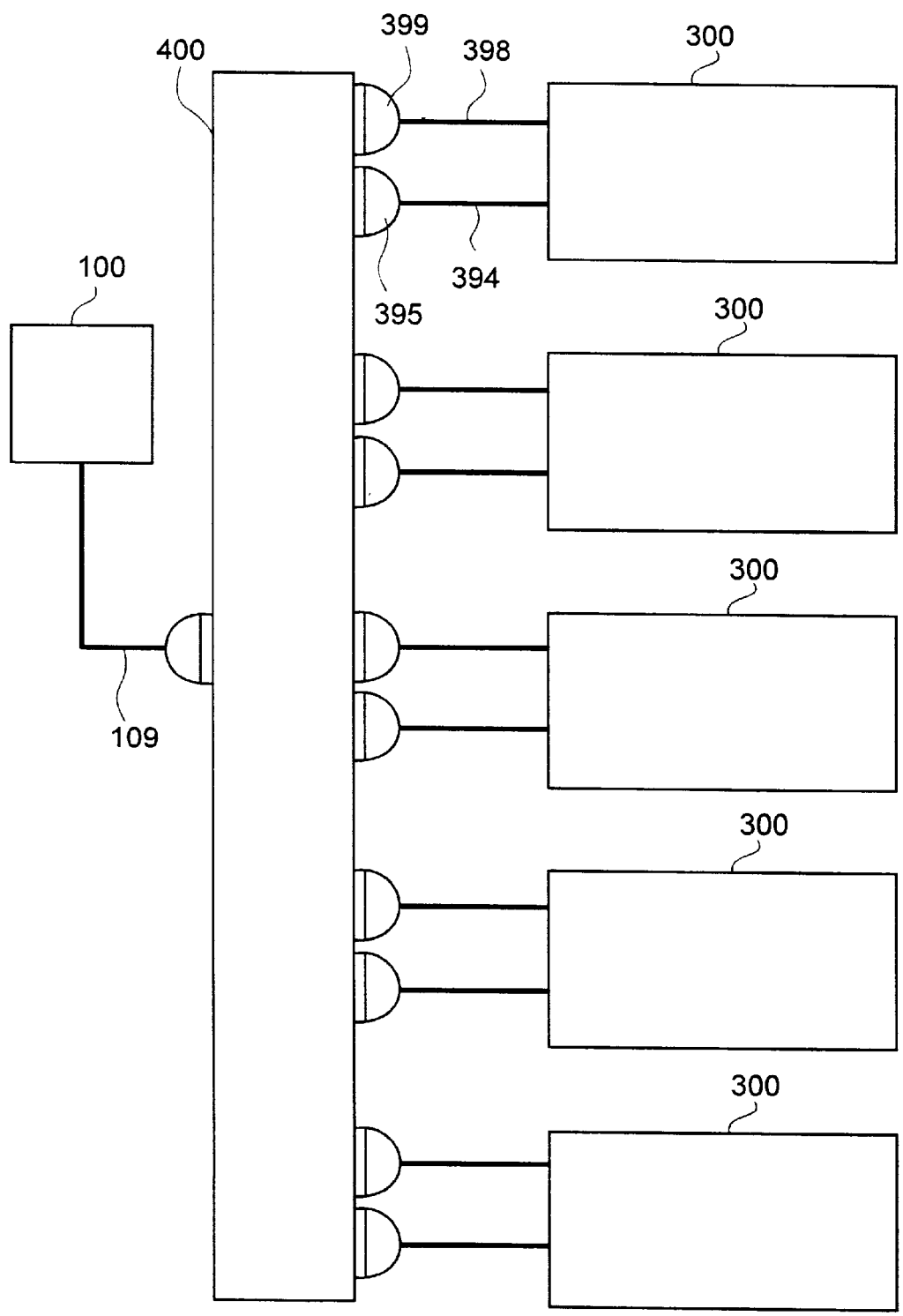
FIG. 6 is a drawing showing the connections in the disk array device that uses five changer devices.

FIG. 6 shows how disk array controller 400 and changer devices 300 are connected. Changer devices 300 include two SCSI busses 394 and 398, with each SCSI bus being connected to disk array controller 400. Connectors 395 and 399 are used for the SCSI bus connections.

Disk array controller 400 controls five changer devices 300 so that they appear to host computer 100 as if they were a single changer device. When a media transfer request is received from host computer 100, disk array controller 400 takes this request and sends them to all five changer devices 300.

The five changer devices 300 that make up the RAID system each contain two magazines 10. As shown in FIG. 1, each magazine 10 has twelve elements so elements are assigned element numbers 1 through 24. Starting from the top, the first magazine contains elements numbers 1 through 12, and the second magazine contains elements numbers 13 through 24. Eleven media are mounted in each magazine, with the magazines holding media for element numbers 1 through 11 and element numbers 13 through 23. Media are not mounted in the lowermost element numbers 12 and 24 of magazines 10.

Disk array controller 400 controls the five changer devices so that they appear to host computer 100 as a single changer device. In this arrangement, disk array controller 400 appears to host computer 100 as a changer device having twenty array elements (numbers 1 through 20) and a single drive (number 100). These twenty array elements correspond to element numbers 1 through 10 and 13 through 22 of the five changer devices 300. In other words, element numbers 11, 12, 23, and 24 of changer devices 300 are hidden from host computer 100.

For example, when host computer 100 issues a command to transfer media from array element number 1 to array element number 100, disk array controller 400 issues a command to the five changer devices to transfer media from elements number 1 to elements number 100. Changer devices 300 take out the media from the uppermost elements (elements number 1) of the first magazines and mount them onto drives 350. This media transfer operation is performed for all five changer devices 300, whereupon disk array controller 400 notifies host computer 100 that the media has been transferred.

If host computer 100 issues a command to transfer media from array element number 11 to array element number 100, disk array controller 400 sends a command to the five changer devices to transfer the media from elements number 13 to element number 100. Array element number 11 is changed to element number 13 because element numbers 11, 12 of changer devices 300 are hidden. Changer devices 300 take out the media from the uppermost elements (number 13) in the second magazines and mount them onto drives 350. When the media transfer operation is completed for all five changer devices 300, disk array controller 400 notifies host computer 100 that the media has been transferred.

Figure 14:
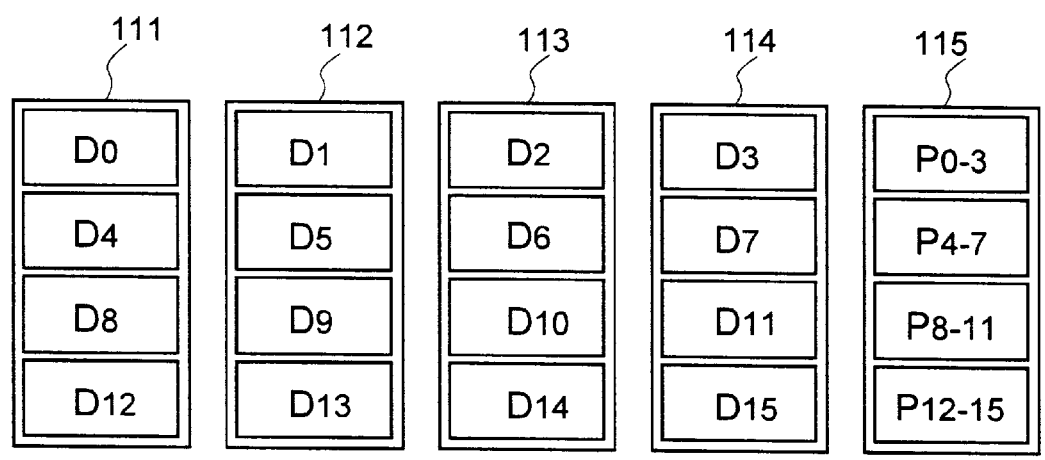
FIG. 14 is a drawing showing a conventional arrangement of data and redundant data.
Figure 15:
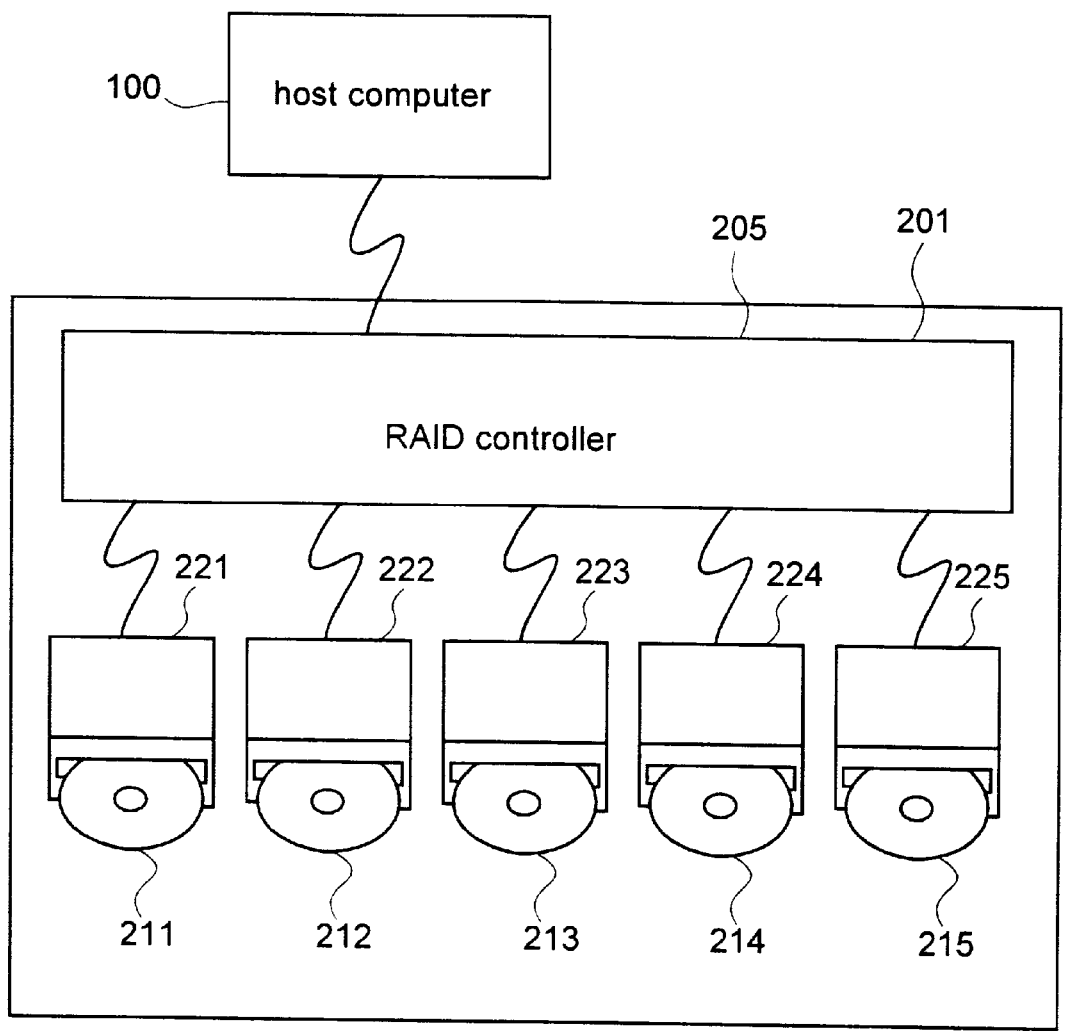
FIG. 15 is a drawing showing a disk array device using removable storage media according to a conventional technology.

Once media has been mounted to drives 350 of the five changer devices 300, it is possible to read and write data in the same manner as in the array configuration described for the conventional technology shown in FIG. 14 and FIG. 15.

The media on which read and write operations are to be performed are transported to the drives by disk array controller 400 in response to a command from host computer 100. Disk array controller 400 issues a command to changer devices 300 to transfer the five corresponding media to drives 350. Once the five media are mounted, read and write operations are performed.

If a medium in this type of RAID system with five changer devices 300 fails and becomes inaccessible, operations can be continued using four media. Disk array controller 400 transfers the medium that generated the failure to an element identified by second color section 50. In this embodiment, the medium would be transferred to element number 12 of the first magazine or to element number 24 of the second magazine.

When the administrator instructs disk array controller 400 to restore the data, a medium is taken out from an element identified by third color section 52 (element number 11 from the first magazine or element number 23 from the second magazine), and this medium is transported to drive 350. Once the medium is mounted to drive 350, disk array controller 400 begins reconstructing the data. When the reconstruction of data is completed, the system shifts from the degraded mode to a normal operation state.

To remove the medium on which the failure occurred, the system administrator opens door 301 and takes out magazine 10. The medium stored in the element identified by second color section 50 in the magazine is the medium on which the failure occurred. By taking out the medium stored in the element identified by second color section 50 in the magazine, the administrator is able to remove the failed medium. With this embodiment, in addition to being color coded, the elements in which failed media are stored are positioned at the lowermost positions of the magazine, thus making identification even simpler.

Also, it is possible to determine if a spare medium is present by checking to see if a medium is in the position indicated by third color section 52 of the magazine. If no medium is present in the elements in the third color section, the administrator can add a medium.

Thus, since failed media and spare media are stored in elements identified by their physical positions in the magazines as well as by colors, the presence of failed media and spare media can be determined by a quick visual inspection.

Changer devices 300 identifies the elements for failed media by using holes 56 on the magazine. As shown in FIG. 4, changer devices 300 include detectors 330. Detectors 330 detect holes 55 on magazines 10 and determine if the magazine has elements where failed media or spare media can be stored. Holes 55 can be implemented by forming physical cavities, as in this embodiment. Alternatively, it would also be possible to use optical sensors in conjunction with materials having different reflectivity.

In this embodiment, elements for storing failed media are distinguished from elements for storing spare media by changing the depths of the cavities.

Second Embodiments

The following is a description, with references to the drawings, of the second embodiment of the present invention. The second embodiment differs from the first embodiment in that instead of magazine 10, three types of magazines (magazine 11, magazine 12, and magazine 13) are used. Also, changer devices 304 are used instead of changer devices 300. Changer device 304 can be mounted with two magazines 12 and one each of magazine 11 and magazine 13.

Figure 7:
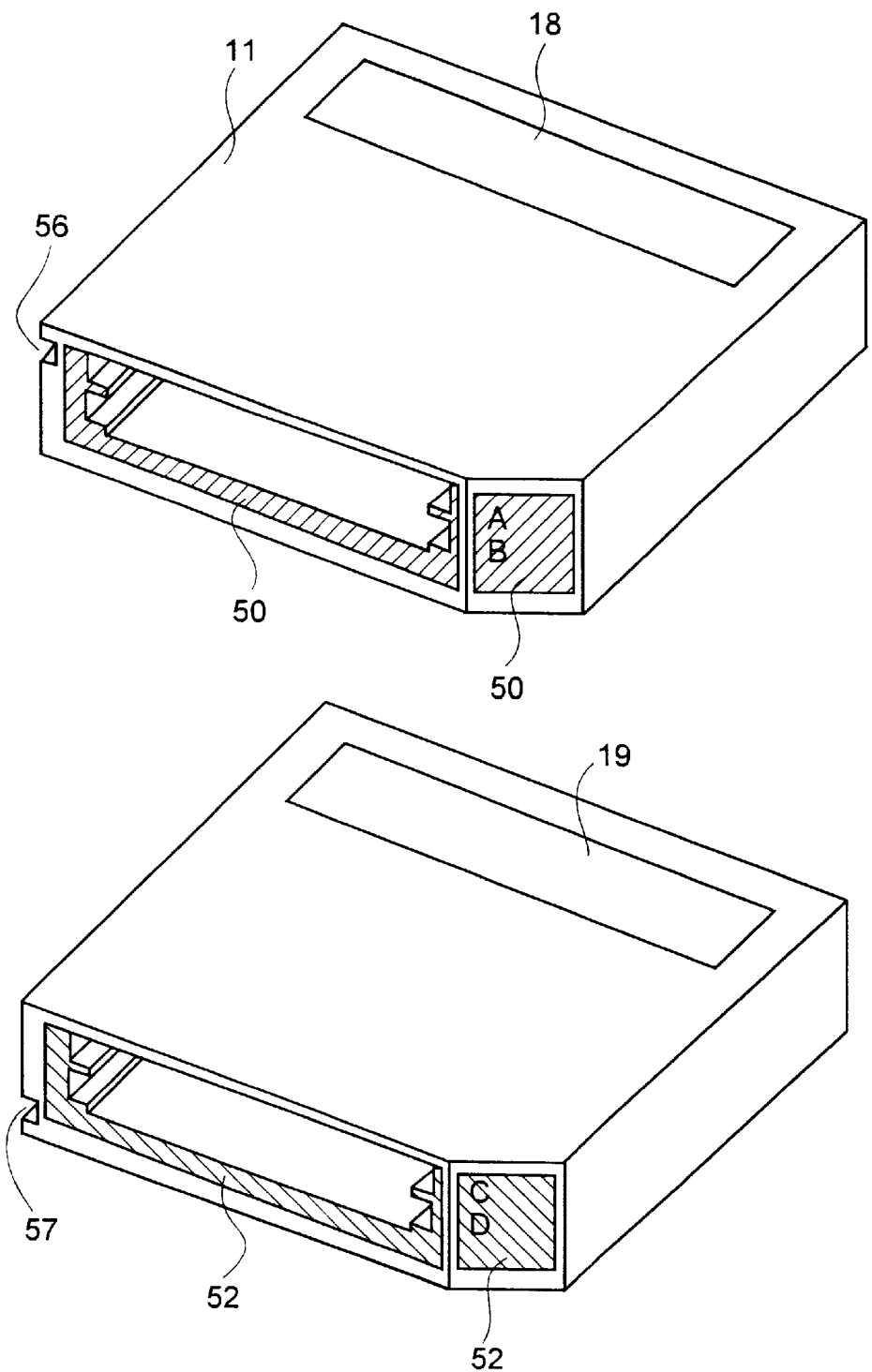
FIG. 7 is a drawing showing a magazine for failed media and a magazine for spare media.
Figure 8:
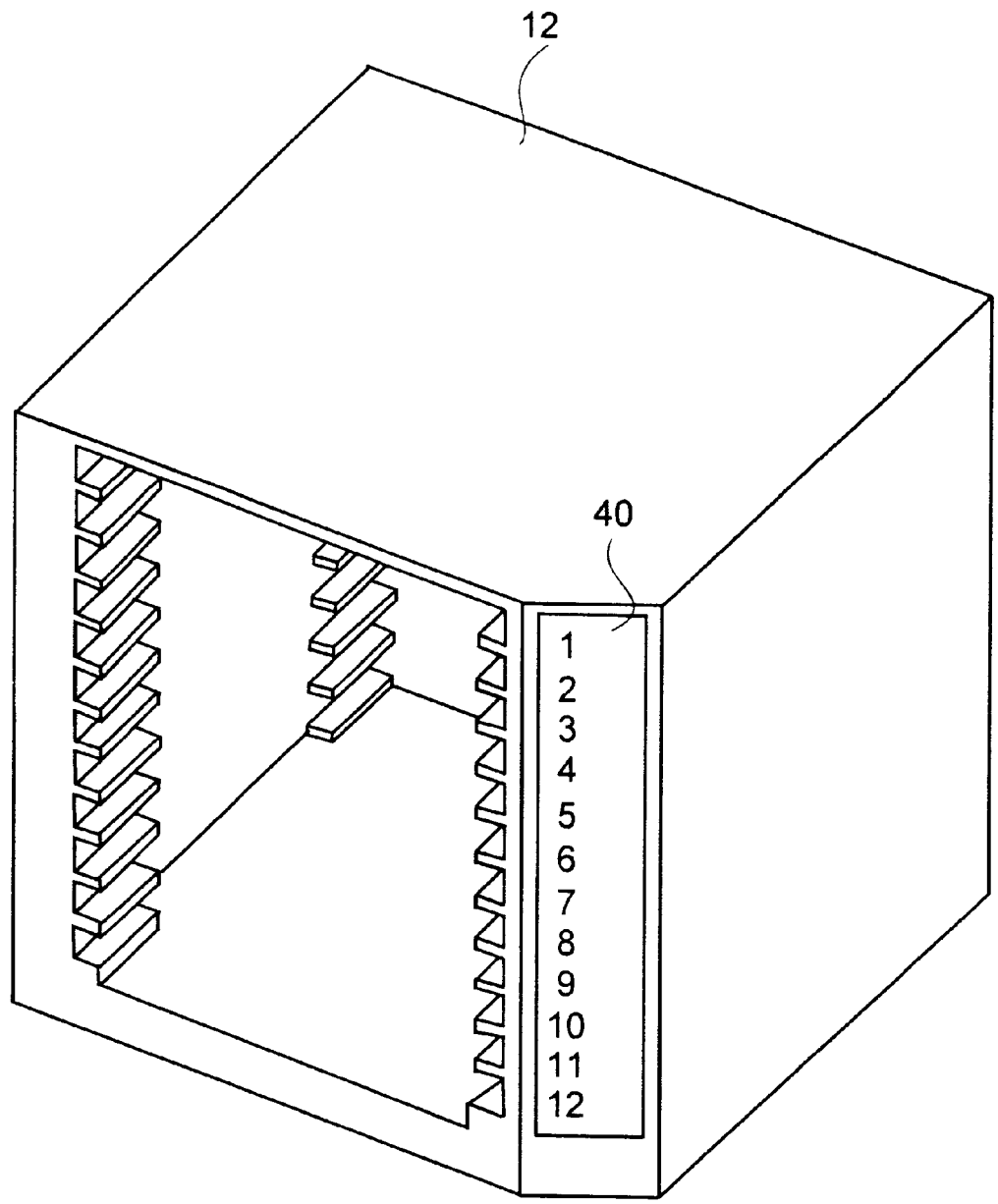
FIG. 8 is a drawing showing a magazine used in the second embodiment and the third embodiment.

In this embodiment, three types of magazines are used. FIG. 7 shows magazine 11 and magazine 12, and FIG. 8 shows magazine 12. The elements of magazine 11 are color-coded using second color section 50. Magazine 11 is used only for holding failed media. The elements of magazine 13 are color coded using third color section 52. Magazine 13 is used only for holding spare media. The elements of magazine 12 are color-coded using first color section 40. Magazine 12 stores standard media used by host computer 100.

Magazine 11 and magazine 13 are magazines that can hold two media each. Since they are similar in shape and size, they may be mounted improperly in changer devices 304. Therefore, a cut-out 56 is formed on magazine 11 and a cut-out 57 is formed on magazine 13 with the cut-outs being formed at physically distinct positions. Projections corresponding to the cut-outs are formed on changer devices 304 so that only magazines with matching cut-outs can be mounted.

A label 18 is also placed on magazine 11 to identify the magazine as being for failed media. Similarly, a label 19 is placed on magazine 13 to identify it as being for spare media.

Magazine 12 can hold twelve media. Unlike the magazine in FIG. 1, magazine 12 is not formed with second color section 50, third color section 52, or holes 55 since magazine 12 is not used to hold failed media or spare media.

Figure 9:
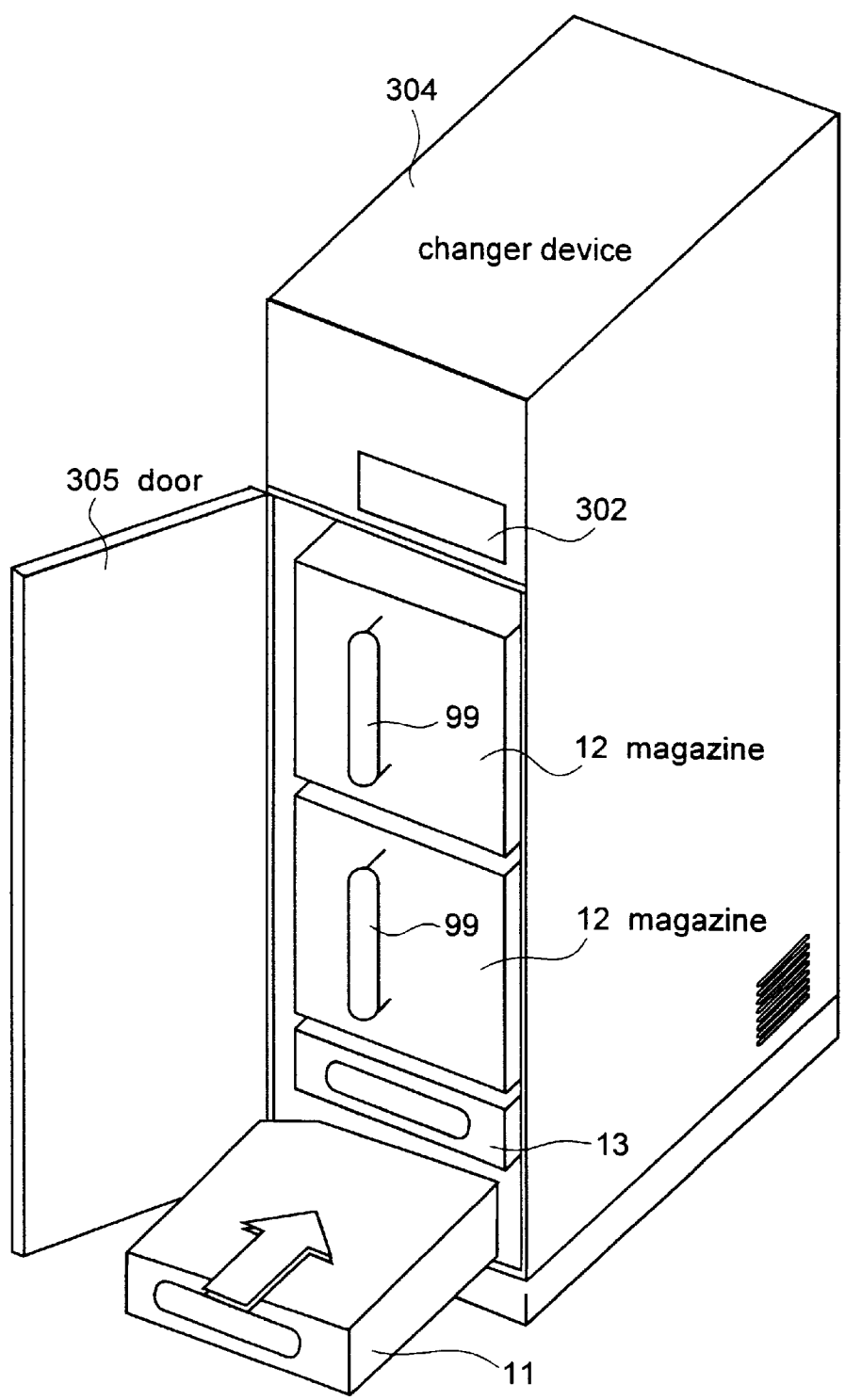
FIG. 9 is a drawing showing an outer view of the changer device in the second embodiment.

FIG. 9 shows changer device 304 as seen from the outside. Changer device 304 has a door 305 that can be opened and closed. When door 305 is opened, magazines 11, magazines 12, and magazines 13 can be inserted and removed. In changer device 304 shown in FIG. 9, two magazines 12 and one each of magazine 11 and magazine 13 can be mounted. Changer device 304 has a liquid crystal display 302 for displaying the status of changer device 304.

Figure 10:
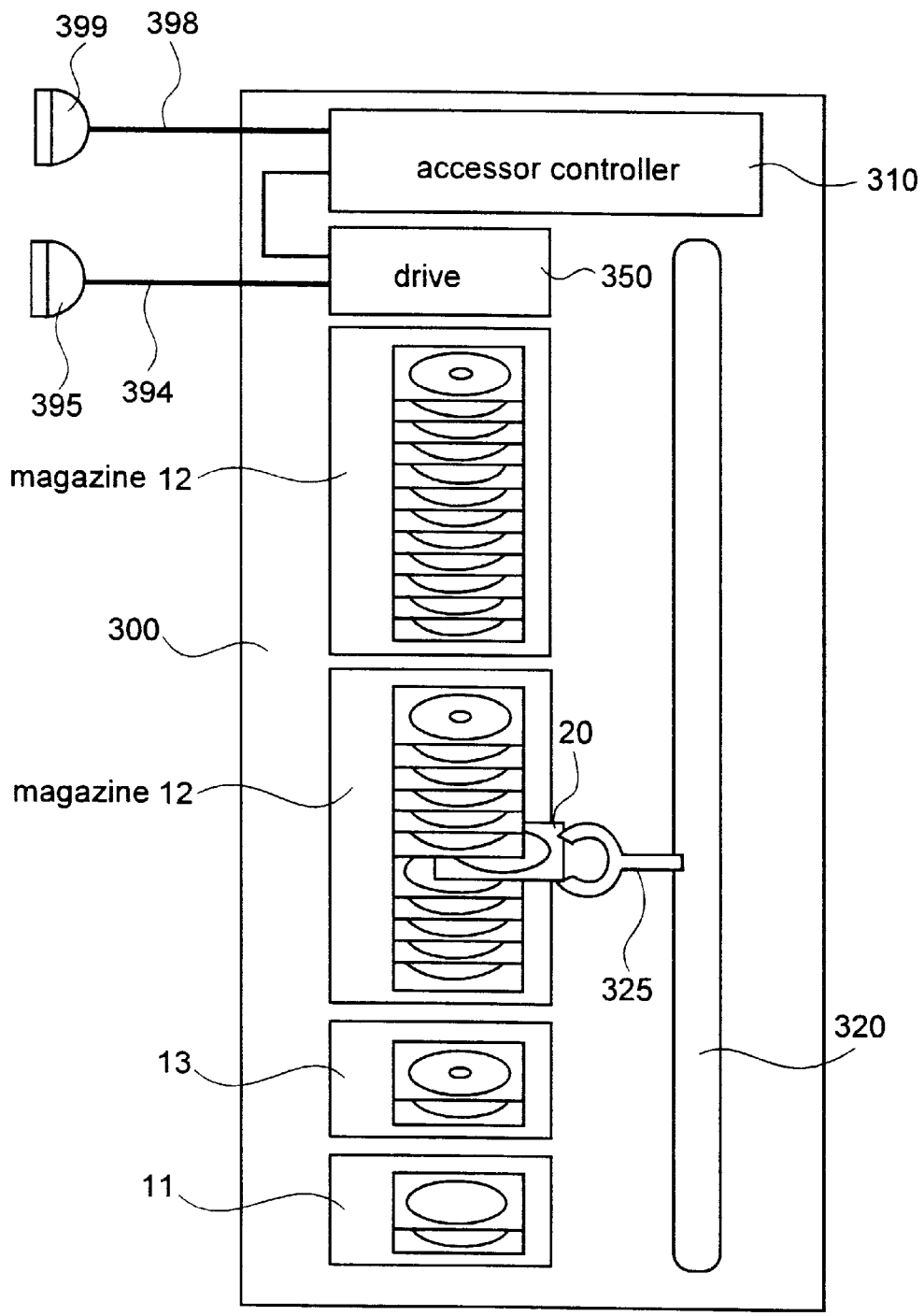
FIG. 10 is a drawing showing the internal structure of the changer device in the second embodiment.

FIG. 10 shows the internal structure of changer device 304. Although the magazines that are mounted are different, the internal structure is the same as that of changer device 300.

The five changer devices 304 that make up the RAID system each have two magazines 12. As shown in FIG. 8, each magazine 12 has twelve elements and the elements are assigned numbers from 1 to 24. Starting from the top, the elements of the first magazine are numbered 1 through 12, and the elements of the second magazine are numbered 13 through 24. Twelve media are mounted in each magazine.

Changer devices 304 are controlled by disk array device 400 so that they appear as a single changer device to host computer 100. To host computer 100, disk array device 400 appears to host computer 100 as a changer device having 24 array elements (numbered 1 through 24) and a single drive (number 100).

No media are mounted in magazine 11. Magazine 13 is mounted with media and placed in changer device 304. The media stored in magazine 13 are used as spare media. The elements in magazine 11 and magazine 13 are hidden from host computer 100.

If a medium in this type of RAID system with five changer devices 304 fails and becomes inaccessible, operations can be continued using four media. Disk array controller 400 transfers the failed medium to magazine 11, which is identified by second color section 50. In this embodiment, the medium is transferred to any empty element in magazine 11.

When the administrator issues a command to restore the data, disk array controller 400 removes a medium from magazine 13, which is color coded via third color section 52, and transfers the medium to drive 350. When the medium is mounted on drive 350, disk array controller 400 begins reconstructing the data. Once reconstruction of the data is completed, the system shifts from degraded mode to a normal operation state.

In order to remove the medium on which the failure occurred, the system administrator opens door 305 and takes out magazine 11. The media held in magazine 11, which is identified by second color section 50, are all media on which failures took place. By taking out the media held in magazine 11, the administrator removes the failed media from the system. In addition to color coding the elements holding failed media, this embodiment dedicates a magazine specifically for failed media to further simplify identification.

Also, the availability of spare media can be checked by seeing if media is present in magazine 13, which is identified by third color section 52. If no media are present in magazine 13, media can be added to make spare media available.

Thus, by dedicating separate magazines for failed media and for spare media, it is possible to simply check specific magazines to determine if there are any failed media or spare media.

Third Embodiment

The following is a description, with references to the drawings, of a third embodiment of the present invention. The third embodiment is different from the second embodiment in that the second embodiment uses magazine 11 and magazine 13 as magazines dedicated to failed media and spare media, but the third embodiment uses a changer device 306 having fixed elements for holding failed media and spare media.

This embodiment only uses magazine 12 shown in FIG. 8. Failed media and spare media are not stored in magazine 12.

In this embodiment, a changer device 306 has dedicated elements for holding failed media and spare media. Fixed element section 17 is formed with a second color section 50 and a third color section 52 to identify the elements for holding failed media and the elements for holding spare media. Spare media is stored by placing a medium 30 on a tray 20.

The media held in fixed element section 17 can be transported by the accessor and can also be taken out by the administrator. In other words, the media can be manipulated from the front or from the back. The accessor is stopped when the door is opened to prevent the administrator from handling the media when the accessor is operating.

If a medium in this type of RAID system using five changer devices 306 fails and becomes inaccessible, operations can still be continued using four media. The medium on which the failure took place is transferred by disk array controller 400 to an element in fixed element section 17 identified by second color section 50. In this embodiment, the medium can be transferred to any free element of the two elements identified by second color section 50.

When the administrator issues a command to restore the data, disk array controller 400 takes out a medium from an element in fixed element section 17 identified by third color section 52, and transfers the medium to drive 350. The medium is mounted on drive 350 a nd disk array controller 400 begins restoring the data. Once the data has been restored, the system shifts from degraded mode to a normal operation state.

To remove the failed medium, the system administrator opens a door 307 and takes out the medium held in an element identified by second color section 50 in fixed element section 17. The failed medium can thus be taken out of the system by removing the medium held in a magazine element identified by second color section 50. In this embodiment, failed media is distinguished from the media in magazine 12 through the color coding of the elements used for failed media as well as through the use of fixed element section 17.

Furthermore, the presence of spare media can be checked by seeing if media is present at third color section 52 of fixed element section 17. If the elements at third color section 52 do not contain media, media can be added to make spare media available.

In this manner, the presence of failed media and spare media can be easily determined visually by having the elements holding failed media and spare media placed in fixed element section 17 to separate these media from the media stored in magazine 12.

Figure 11:
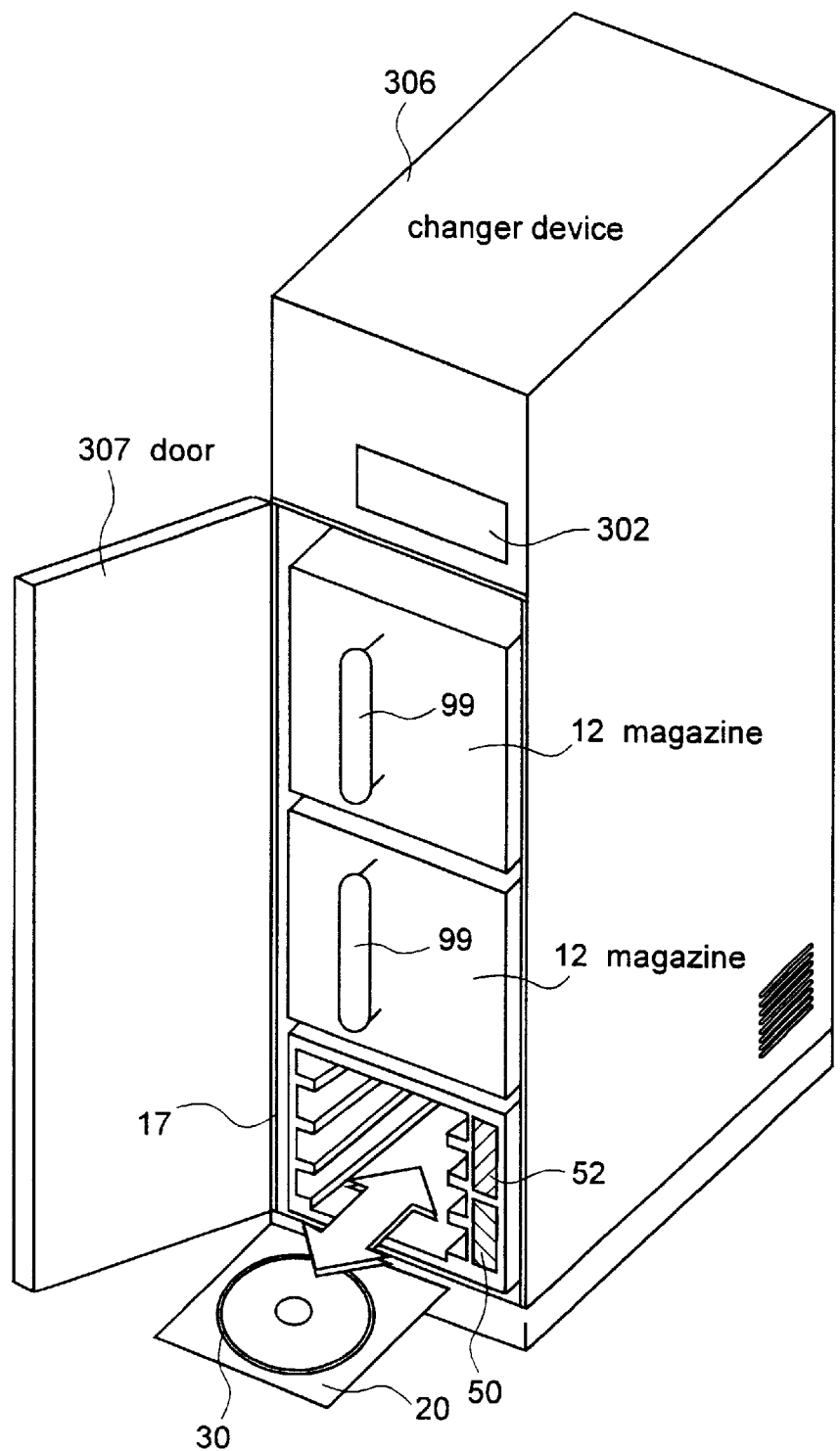
FIG. 11 is a drawing showing an outer view of a changer device in the third embodiment.
Figure 12:
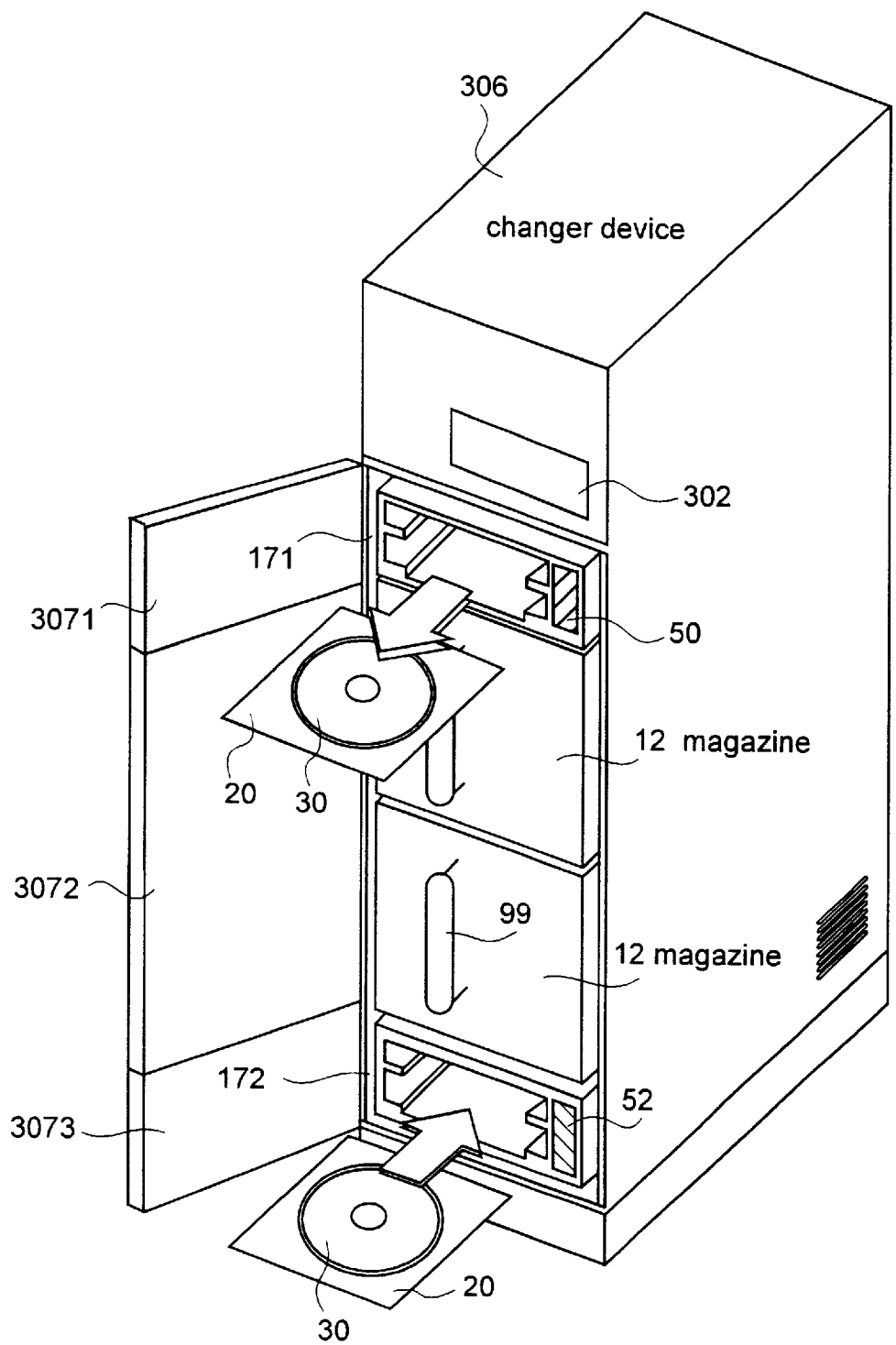
FIG. 12 is a drawing showing an outer view of a changer device in the third embodiment.
Figure 13:
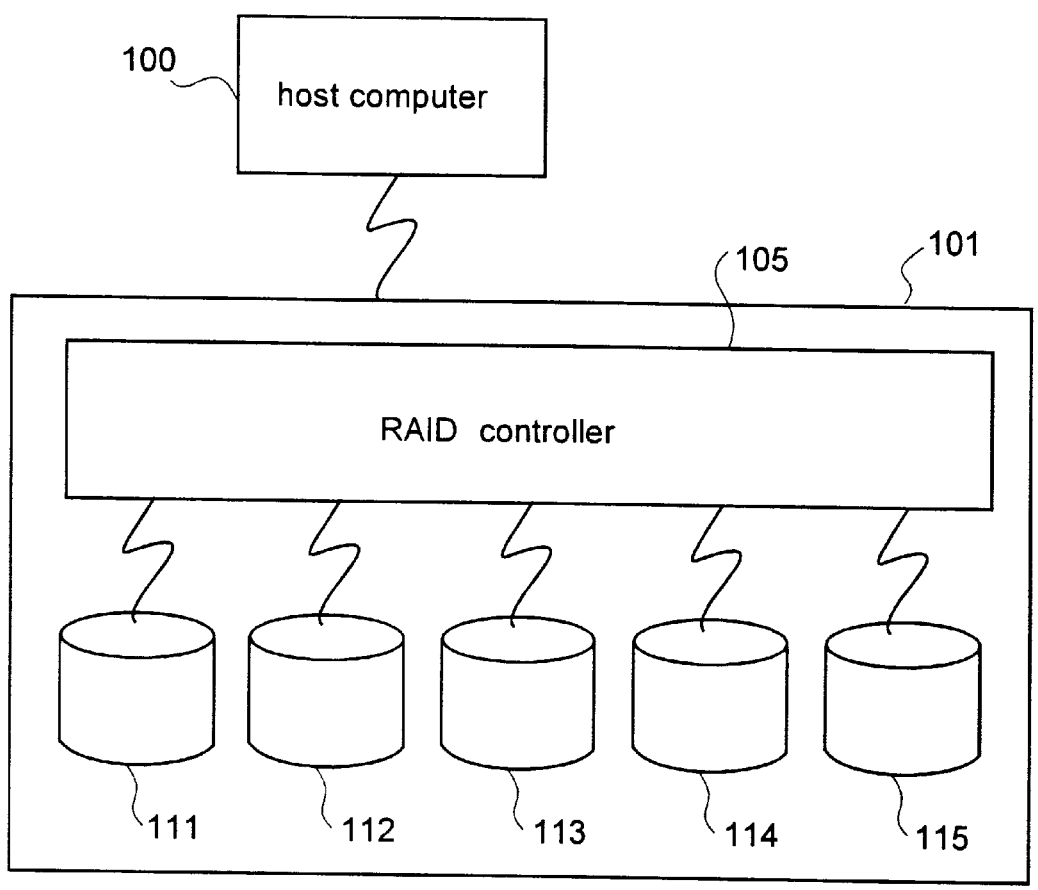
FIG. 13 is a drawing showing a conventional disk array device that uses hard disk drives.

This embodiment can also be implemented by substituting the changer device shown in FIG. 12 for the changer device shown in FIG. 11. While the changer device in FIG. 11 has only one fixed element section 17, the changer device in FIG. 12 has two fixed element sections 171 and 172. Fixed element section 171 is marked with second color section 50 and fixed element section 172 is marked with third color section 52. Fixed element section 171 and fixed element section 172 are positioned away from each other, with fixed element section 171 positioned toward the top of the changer device, and fixed element section 172 positioned toward the bottom of the changer device. This arrangement reduces the possibility of errors by the administrator.

Furthermore, three separate doors 3071, 3072, and 3073 are formed as shown in FIG. 12. For example, when failed media is to be taken out, only door 3071 needs to be opened. To add spare media, only door 3073 needs to be opened. The possibility of errors by the administrator can be reduced by locking the doors or placing color-coded labels on the doors.

By using means for supporting storage media (elements) in means for managing storage media (changer devices), as described in this specification, failed storage media can be easily identified in the changer. This allows the administrator using this system to easily take out failed storage media from changers. Furthermore, when taking out failed storage media, the administrator is prevented from mistakenly taking out other storage media.

What is claimed is:

1. A method for managing failed storage media in a changer device including a plurality of storage media, a magazine for holding said plurality of storage media, a drive for reading and writing data to a storage medium selected from said plurality of storage media, and a media transporting device transporting said selected storage medium to said drive as well as transporting said selected storage medium to said magazine, comprising the steps of:

establishing a specific position in said magazine identifiable to a user by a first identifier and identifiable to said media transporting device by a second identifier, said specific position being a destination for a failed storage medium when data cannot be read or written to said failed storage medium disposed at said drive; and taking said failed storage medium disposed at said drive and storing said failed storage medium at said specific position by said media transporting device.

2. A method for managing failed storage media in a changer device including a plurality of storage media, a magazine for holding said plurality of storage media, a drive for reading and writing data to a storage medium selected from said plurality of storage media, and a media transporting device transporting said selected storage medium to said drive as well as transporting said selected storage medium to said magazine, comprising the steps of:

detecting an inability to read or write data to a failed one of said storage media disposed at said drive; and storing said failed storage medium at said drive to a specific position in said magazine by said media transporting device identifiable to a user by a first identifier and identifiable to said media transporting device by a second identifier.

3. A method for managing failed storage media as recited in claim 2, wherein said specific position is at an uppermost position of said magazine.

4. A method for managing failed storage media as recited in claim 2, wherein said specific position is at a lowermost position of said magazine.

5. A method for managing failed storage media in a changer device including a plurality of storage media, a magazine for holding said plurality of storage media, a plurality of drives for reading and writing data to storage media, each of said drives reading and writing data to a storage medium selected from said plurality of storage media, and a media transporting device transporting said selected storage media to said drives and transporting said selected storage medium to said magazine, comprising the steps of:

storing said data and parity data in a striped manner on a plurality of storage media transported to said plurality of drives in response to requests to write data;

transporting a failed one of said storage media at said drive to a position in said magazine by said medium transporting device identifiable to a user by a first identifier and identifiable to said media transporting device by a second identifier when one drive of said plurality of drives is incapable of reading or writing data to the failed storage medium at said drive;

transporting an operational storage medium stored in said magazine to said one drive by said media transporting device;

reconstructing data of said failed storage medium that could not be read or written from said storage media transported to said drives; and storing said reproduced data to said operating storage medium.

6. A method for managing failed storage media as recited in claim 5, wherein said operating storage medium is stored beforehand in a specific position on said magazine.

7. A method for managing failed storage media as recited in claim 5, wherein said specific position is at a lowermost position of said magazine.

8. A method for managing failed storage media as recited in claim 1, wherein said first identifier is a specific color and said second identifier is a hole identifiable by said media transporting device.

9. A changer device comprising:

a magazine which holds a plurality of storage media;

a drive which reads and writes data to a storage medium selected from said plurality of storage media; and a media transporting device which transports said selected storage medium from said drive to said magazine and from said magazine to said drive, wherein said magazine has a tray allocated to a specific position, which houses failed storage media, which has a first identifier that indicates to a user that said tray houses said failed storage media, and which has a second identifier that indicates to said media transporting device that said tray is a destination of said failed storage media.

10. A changer device according to claim 9, wherein said changer device detects said failed storage media, wherein said media transporting device transports said detected failed storage media to said tray by using said second identifier.

11. A changer device according to claim 10, wherein said tray is allocated to a position that is visible to a user.

12. A changer device according to claim 11, wherein said tray is allocated to a position at a top of said magazine.

13. A changer device according to claim 9, wherein said tray houses a normal media, wherein said media transporting device puts said failed storage media in the place of said normal media.

14. A changer device comprising:

a magazine which holds a plurality of storage media;

a plurality of drives which read and write data to storage mediums selected from said plurality of storage media; and a media transporting device which transports said selected storage medium from said plurality of drives to said magazine and from said magazine to said plurality of drives, wherein said magazine has a plurality of trays allocated to specific positions, which house failed storage media, which has a first identifier that indicates to a user that said plurality of trays house said failed storage media, and which has a second identifier that indicates to said media transporting device that said plurality of trays are a destination of said failed storage media, wherein said plurality of drives write data and redundant data into said storage mediums.

* * * * *